Dec. 27, 1938.  C. H. WHITE  2,141,805
TRANSPORT TRUCK
Filed Jan. 27, 1937
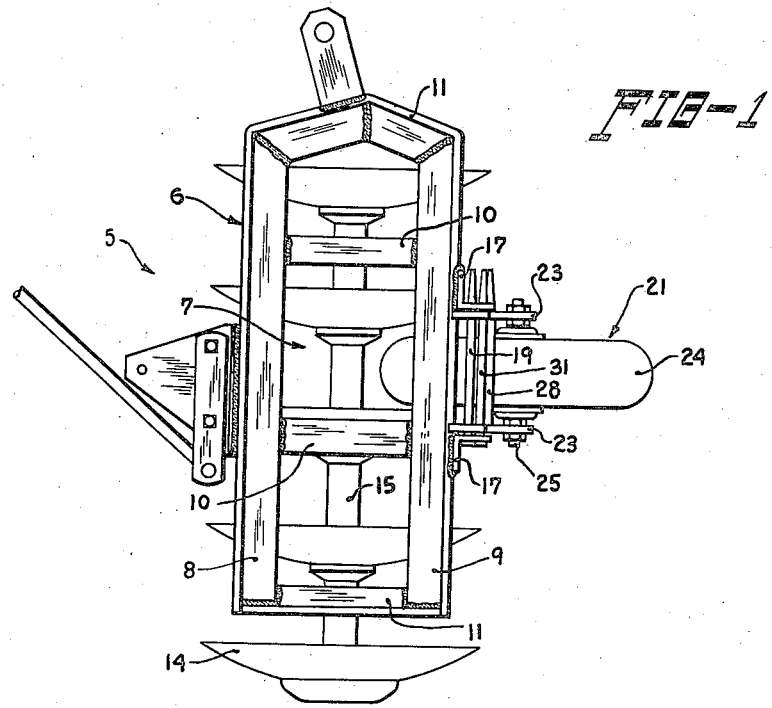
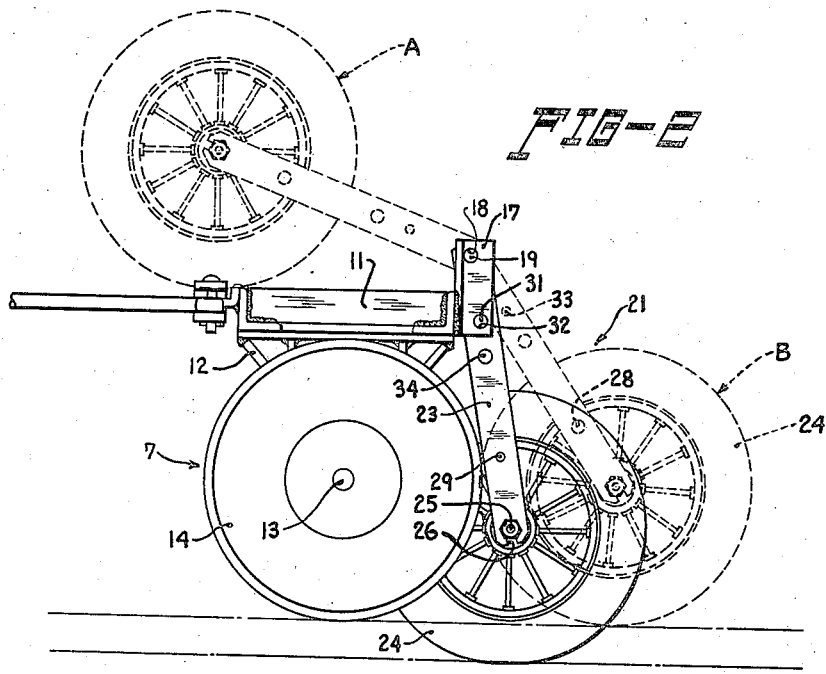
INVENTOR
Charles H. White.
WITNESS
NORMAN WESTLING
ATTORNEYS.

Patented Dec. 27, 1938

2,141,805

UNITED STATES PATENT OFFICE 2,141,805

TRANSPORT TRUCK

Charles H. White, Moline, Ill., assignor to Deere & Company, Moline, Ill., a corporation of Illinois Application January 27, 1937, Serial No. 122,563

9 Claims. (Cl. 55—73).

My invention relates to transport trucks of the foldable type which are connected to and made a permanent part of an agricultural implement such as a disk harrow or the like, for transporting the implement to and from the field and over improved highways with the implement held out of contact with the ground, but which can be folded into an inoperative position when the implement is placed in its ground working position.

An object of my invention is to provide a simple and inexpensive transport truck which is pivotally attached to the implement frame to raise the implement for transport and may be swung to a position above the implement when the implement is in a lowered or operating position.

A further object of my invention is to provide a transport truck that can be swung into position for either transport or operation of the implement by a forward or backward movement of the implement.

Other objects and advantages of my invention will become apparent to those skilled in the art after a consideration of the following detailed description, reference being had to the appended drawing, wherein Figure 1 is a plan view of a section of a disk harrow showing a transport truck, embodying the principles of my invention, attached thereto in the position it takes when the implement is raised for transport, and Figure 2 is a side view of the structure shown in Figure 1 and illustrating, in broken lines, the raised position of the transport truck when the implement is in a lowered or operating position, and also the lowered position of the transport truck preparatory to lifting the implement thereon.

In the present instance I have shown my transport truck as applied to a section of a disk harrow. The disk harrow, which is indicated in its entirety by numeral 5, is of a conventional design and includes a frame 6 and a disk gang 7. The frame 6 comprises front and rear frame bars 8 and 9, respectively, which are secured in spaced parallel relation by inner transverse brace members 10 which extend between the bars 8 and 9 inwardly of the ends thereof, and end brace members 11 which connect the adjacent ends of the bars. The disk gang 7 is supported on depending brackets 12 secured to the under side of the frame 6. The gang 7 includes a gang bolt 13 which is carried on the depending brackets 12 and upon which are mounted, in spaced relation, a plurality of disk members 14. The disk members 14 are held in the desired spacing by spools 15 which are mounted on the gang bolt 13 between the disks 14.

A pair of angle iron brackets 17 are disposed in spaced relation on the rear of the rear frame bar 9 and are welded or otherwise fixedly secured thereto. The brackets 17 extend above the frame bar 9 and are provided adjacent their upper ends with aligned holes 18 in which is journaled a pivot bolt 19 which is adapted to pivotally support a transport truck 21. The transport truck 21 includes a pair of arms 23 which are pivotally supported adjacent one end on the pivot bolt 19 between the brackets 17. The arms 23 are disposed in spaced relation and a rubber tired supporting wheel 24 is provided therebetween, although any other type of wheel may be used without departing from the principles of this invention. The wheel 24 is journaled on an axle bolt 25 mounted in slots 26 formed in the opposite ends of the arms 23.

When the implement is in operation the transport truck 21 is carried above the frame 6, as shown in the dotted line position A in Figure 2, where it is out of the way and where it also serves to add weight to the implement which is a desirable feature in the case of a disk harrow. When the implement is to be moved from one field to another or over an improved highway, the transport truck 21 is swung rearwardly and downwardly in a vertical plane to bring the wheel 24 into engagement with the ground, as shown in the dotted line position B in Figure 2. To raise the implement, a pin 28 is inserted through aligned holes 29 provided in the arms 23, said holes 29 being disposed in such a manner that pin 28 extends through the wheel 24 between the spokes thereof. The implement is then moved rearwardly causing the wheel 24 to rotate until the adjacent spoke engages the pin 28 whereupon the wheel 24 and arms 23 are locked to form a single unit and continued movement in this direction cranks the arms and wheel forwardly thus raising the implement clear of the ground. In order to retain the truck 21 in this position a pin 31 is inserted through aligned holes 32 in the brackets 17 and holes 33 in the arms 23 after which the pin 28 may be removed to permit the wheel 24 to rotate to transport the implement over the ground. The pin 28, when not employed to lock the arms 23 and wheel 24, is carried in aligned holes 34 provided for this purpose in the arms 23 between the brackets 17 and the wheel 24.

To lower the implement from a transport position, the pin 31 can be withdrawn from the aligned holes 32 and 33 in the brackets and arms, respectively, allowing the weight of the implement to force the wheel to swing rearwardly, since the arms are inclined at a slight angle forwardly from the vertical in transport position. If it is desired to lower the implement more gradually, the pin 28 can first be inserted in the aligned holes 29 and the implement backed until a spoke is in contact with the pin 28. Then, when the pin 31 is withdrawn the pin 29 prevents the implement from forcing the wheel rearwardly, and the implement can be lowered by moving it slowly forward, pivoting on the arms 23.

It is believed that a transport truck constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What I claim, therefore, and desire to secure by Letters Patent is:

1. In combination with an implement having a frame, a bracket fixed on said frame, a transport truck comprising a supporting arm swingably mounted on said bracket, a wheel journaled on said supporting arm, said supporting arm being movable into a position to raise said implement for transport, said bracket and said arm having openings which are disposed in alignment when said implement is in a raised position and means adapted to be inserted through said aligned openings for locking said arm to said bracket to hold said arm in said transport position.

2. In combination with an implement having a frame, a bracket fixed on the rear of said frame, a transport truck comprising a supporting arm swingably mounted on said bracket, a wheel journaled on said supporting arm, said supporting arm being movable into a downwardly extending position to swing said wheel below and at the rear of said frame to raise said implement for transport, said bracket and said arm having openings which are disposed in alignment when said implement is in a raised position, and means adapted to be inserted through said aligned openings for locking said arm to said bracket to hold said arm in said transport position, and said supporting arm being swingable rearwardly and upwardly in a vertical plane to a forwardly extending position above said frame to lower said implement into operating position.

3. In combination with an implement having a frame, a transport truck comprising a supporting arm swingably mounted on said frame, a wheel journaled on said supporting arm, said arm having an aperture, a pin adapted for insertion through said aperture and engageable with a spoke of said wheel to prevent rotation of said wheel, whereby when said implement is moved longitudinally, said arm is cranked downwardly to raise said implement, and means for locking said arm in the raised position of said implement.

4. In combination with an implement having a frame, a bracket on the rear of said frame, a transport truck comprising a supporting arm mounted on said bracket and swingable in a vertical plane rearwardly of said frame, a wheel journaled on said supporting arm, said arm having an aperture, a pin adapted for insertion through said aperture and engageable with a spoke of said wheel to prevent rotation of said wheel, whereby when said implement is moved rearwardly said arm is cranked forwardly to raise said implement, said bracket and said arm having aligned openings to receive a pin for locking said arm in said forward position.

5. In combination with an implement having a frame, a pair of brackets secured in spaced relation on said frame, a horizontal pivot member supported in said brackets, a transport truck comprising a pair of supporting arms swingably mounted on said pivot members, a wheel axle supported in said arms, a wheel journaled on said axle, said arms being movable into a substantially vertical position to raise said implement for transport, said bracket and said arm having aligned openings, and a pin adapted for insertion through said openings to lock said arm in said substantially vertical position.

6. In combination with an implement having a frame, a bracket on the rear of said frame, a transport truck comprising a supporting arm mounted on said bracket and swingable in a vertical plane to a forwardly extending position above said frame, a wheel journaled on said supporting arm, said arm having an aperture, a pin adapted for insertion through said aperture and engageable with a spoke of said wheel to prevent rotation of said wheel, whereby when said implement is moved rearwardly said arm is cranked forwardly to raise said implement.

7. In combination with an implement having a frame, a pair of brackets secured in spaced relation on said frame, a horizontal pivot member supported in said brackets, a transport truck comprising a pair of supporting arms swingably mounted on said pivot member and swingable in a vertical plane to a forwardly extending position above said frame, a wheel axle supported in said arms, a wheel journaled on said axle, and means engageable with said arms and said wheel for locking the wheel to the arms, whereby when said implement is moved rearwardly with said wheel in contact with the ground said arms are moved into a substantially vertical position to raise said implement for transport.

8. In combination with an implement having a frame, a transport truck comprising a supporting arm swingably mounted on said frame and swingable in a vertical plane to a forwardly extending position above said frame, a wheel axle supported on said arm, a wheel journaled on said axle, and means engageable with said arm and said wheel for locking the wheel to the arm, whereby when said implement is moved rearwardly with said wheel in contact with the ground said arm is moved into a substantially vertical position to raise said implement for transport.

9. In combination with an implement having a frame, a transport truck comprising a supporting arm swingably mounted on said frame and swingable in a vertical plane to an inoperative position, a wheel axle supported on said arm, a wheel journaled on said axle, and means for optionally locking said wheel to said arm, whereby when said implement is moved in one direction with said wheel in contact with the ground, said arm is brought into a substantially vertical position to raise said implement for transport.

CHARLES H. WHITE.